Reissued Feb. 4, 1930 Re. 17,584

UNITED STATES PATENT OFFICE

FRANCIS G. OKIE, OF ST. PAUL, MINNESOTA, ASSIGNOR TO MINNESOTA MINING & MANUFACTURING COMPANY, OF ST. PAUL, MINNESOTA, A CORPORATION OF MINNESOTA

COMPOSITE STRUCTURE

No Drawing. Original No. 1,635,801, dated July 12, 1927, Serial No. 670,543, filed October 24, 1923. Application for reissue filed April 19, 1928. Serial No. 271,395.

My present invention relates in general to the treatment of material, preferably in sheet form, and more particularly the treatment of material for the purpose of forming or attaining composite structures, of which well known forms of abrasives such as what is commonly known as sand-paper is an example. The present application is in part a continuation in part a division of my copending applications Serial Nos. 428,287 and 428,289 filed December 4, 1920, and 541,248, filed March 4, 1922, and my Patent Number 1,565,028.

Although I hereinafter disclose the practice of my invention in connection with abrasives such as sand-paper, it will be understood that my invention, or certain features thereof, has a wider field of utility.

Composite structures of the abrasive type such as sand-paper or emery cloth comprise generally (*a*) a base of sheet material, which may be felted as in the case of paper or woven as in the case of cloth, (*b*) a more or less finely comminuted resistant material having abrading properties, such as garnet or corundum, and (*c*) a binder generally in the form of a glue which serves to bind the abrasive to the base.

The abrasive products as produced at present have as incidents certain features among which are affinity for moisture rendering them substantially inutile in the presence of water or moisture, and cracking, with consequent exposure of the base, when bent.

The principal objects of my present invention are the provision of a binder which functions more efficiently than any known to me; the provision of a binder characterized by flexibility without cracking or other undesirable effects; the provision of a binder characterized by extensibility and compressibility to accommodate itself to flexion of the base; the provision of a binder by means of which the desired adhesive action between it and the base is attained not only efficiently but also with a desirable degree of acceleration, and more particularly the provision of a binder in which the drying action will be effective from the contact surface between it and the base outwardly; the provision of a binder in which the drying action will be effective from the outer surface inwardly; the provision of a binder characterized by a drying action that permits of handling the product with a minimum of delay and more particularly such handling without impairment of the superficies of the material; the provision of a binder characterized by an accelerated drying action; the provision of a binder characterized by a limitation of its drying action; the provision of an improved moisture-proofing treatment for material, and especially material in a sheet form, and more particularly for causing a moisture proofing agent to penetrate into the material; the provision of a moisture-proof composite abrasive structure; the provision of a binder having moisture-proofing functions, and the provision generally of an improved composite abrasive structure and of a method of producing the same together with such other objects and additional benefits and advantages as may hereinafter appear or be pointed out.

In the employment of my present invention for the production of sandpaper and the like (which I cite for purposes of example) I use as the base a sheet of material (which may be paper or cellulose, or paper or cloth saturated or partly saturated with cellulose or the like) as will conveniently serve the employment contemplated, and as the abrasive such comminuted material (which may be crushed garnet) similarly adapted to serve the function in view.

It is desirable that the binder utilized have the functions and characteristics not only of great mechanical strength and of great binding strength, but also that it be non-hygroscopic, permeative, moisture resistant, easily worked, readily obtainable, inexpensive and facilely applied.

I have discovered that gums of such types as rosin are peculiarly adapted for the attainment of these ends, and ordinary turpentine rosin is preferred by me as best attaining the desired end, viewed from certain aspects. Other gums and resins, natural or synthetic, having the desired characteristics may also be utilized.

In preparing the binder for use, the gum is used in connection with a suitable vehicle which I prefer is of a type such as linseed oil, China wood oil, otherwise known as tung oil, Perilla oil or fish oil, or even a semi-drying oil such as soya-bean oil, for reasons which I will proceed to explain.

In applying a gum prepared with a vehicle such as China wood oil to one surface of a base of paper, for example, I have found that the action of the vehicle involves a penetration of the base by the vehicle, for example, China wood oil or any similar drying oil or semi-drying oil.

This results in a moisture-proofing of the material even against the absorption of moisture through the surface opposite to that to which the binder is applied, without at the same time defacing or otherwise undesirably affecting such opposite surface.

This penetration by the vehicle, particularly when coupled with the use of the character of gum pointed out above, carries with it in such penetration a certain amount of finely divided gum so that a coating and binding action is secured between the fibres of elemenetal portions of the base which thus substantially retards, if it does not entirely prevent, disintegration of the material of the base, in addition to preventing access of moisture through the base to the plane of contact between the base and the main mass of the binder material.

The efficient action of the binder may be enhanced in the manufacture of sandpaper if the binder is applied to the base by the use of pressure and the more or less finely divided abrasive is then applied in such a manner as to cause it to adhere to the binder.

In order to accelerate the adhesion between the binder and the base, I have discovered it desirable to use with the binder a modifying agent the action of which is to cause a desiccation of the binder initiated at the contact surface of the binder with the base and effective outwardly.

In my experience I have discovered that there are a number of materials having a metallic base which are useful for my present purposes, that manganic oxides are peculiarly useful and that borate of manganese best combines siccative energy with the desirable susceptibility to fine grinding.

Due to the relatively slow drying of binders generally, difficulties are encountered in handling the structure, within a convenient period because of the soft and sticky character particularly of the exposed surfaces of the binder. This objection I mitigate by associating with the improved binder a substance the action of which is to produce an accelerated drying action effective primarily at the exposed surface and working inwardly, and for this purpose I incorporate in the binder a modifying element peculiarly effective in its action as an oxidizing agent on such vehicles as linseed, China wood or tung oil and as a retarding agent with reference to the excess absorption of the vehicle by the base.

The substance I have discovered to be particularly adapted for the purpose is carbonate of lead, particularly that which is a new electrolytic process white lead and which in my experience is found to be more satisfactory than any other known form of carbonate of lead.

Whereas by itself the white lead adds but relatively little strength to the binder, in association in the binder with the borate of manganese it intensifies the action of the binder in holding the abrasive firmly against the base.

For intesifying the binding action of the binder and for intesifying the drying action of the dryers, and at the same time accomplishing such ends by the employment of a material which is efficacious in holding the mineral elements in suspension without loss of siccative energy or reducing the relative fluidity of the material I have discovered that it is advantageous to employ as part of the binder a paste dryer. This may comprise such mineral substances as sugar of lead and borate of manganese suspended in a resinous vehicle but I find it preferable to form the paste dryer so as to have the minerals contained therein in the form of acetate of lead and resinate of manganese. I have found by experience that the paste dryer should be somewhat in the nature of cheesy butter, rather softer, and of a light brownish grey color.

As an auxiliary in (1) accentuating the adhesion of the binder to the paper, (2) facilitating to a certain extent the spreading of the binder, and (3) modifying as desired the consistency of the binder as is useful in cases where it is desired to render it more fluid, I have discovered that the use of a japan dryer is desirable. Such a dryer as that known as Schrack japan is convenient. One form of this contains shellac, red lead, litharge, manganese oxid, burnt umber, gum, linseed oil and turpentine q. s.

In order to give the binder the desired body volumetrically considered I preferably employ a varnish consisting largely of China wood oil, linseed oil, Perilla oil, or fish oil, boiled until it approaches a solid state. As far as feasible this should be as free as possible from glycerides and fatty acids.

Though I have hereinabove disclosed certain forms of useful dryers having various characteristics, and likewise intensifiers, I have discovered that where it is advisable that the siccative action thereof be limited, or at least retarded, under certain conditions, or when producing material for certain purposes, that it is desirable to incorporate in the binder a non-drying oil such as castor oil or the like, for such purposes.

Sandpaper made in accordance with the disclosure of my present invention is characterized by great flexibility without any adverse effects, such as cracking of the binder or base, or loosening of one from the other.

Due to the character of binder for sandpaper and the like which I thus produce, the adhesion between the base, binder and abrasive is such that an auxiliary bonding material, such as the outermost or top sizing coat, customarily found necessary, may for some purposes be dispensed with, but may be applied for other purposes. Additionally, the nature of the bond between the base binder and abrasive is such that sandpaper produced according to my present invention is characterized by greater freedom from clogging when used on varnished and analogous surfaces.

In cases where it is desirable or necessary to employ a sizing coat, I find that a thinned composition similar to that disclosed herein as forming the binder itself, is satisfactory. As an example of the sizing coat, which also may be employed as a moisture-proof backing, I submit the following formula by weight:

(A)

| | |
|---|---|
| Treated rosin or resin | 2700 |
| Chinawood oil | 13962 |
| Mineral dryers | 79 |
| Thinners | 12611 |

An alternative formula for the same purpose may include the following ingredients by weight:

(B)

| | |
|---|---|
| Treated rosin or resin | 2700 |
| Chinawood oil | 8100 |
| Mineral dryer | 83 |
| Linseed oil | 2125 |
| Thinners | 8850 |

The materials used by me as hereinabove described may be varied in character so as to vary the charactertistics of the binder from the standpoint of adhesiveness, non-hygroscopic, and flexibility. Where such variation in the use of materials is employed to produce, for instance, increased adhesion between the binder and the abrasive, such increase may be attained though possibly at a certain expense in its charactertistic of flexibility. Due, however, to this very same increased adhesiveness, one or more of the outer layers of the base may be removed as by the employment of a base which involves the use of a built up structure having a number of plies, certain of which may be removed, or by shaving off part of the thickness of the base, or by splitting an ordinary sheet of paper. This is made possible in the case of my improved binder since I am able to regulate the degree of its penetration of the paper, as desired, and so, after soaking, I am able to split an ordinary sheet.

By this process I am enabled to obtain sandpaper characterized by extraordinary thinness and flexibility, in that I am able to form sandpaper and the like with a base so thin that such product could not be manufactured, if the base originally used were of the thinness ultimately desired.

In my preferred practice with China wood oil and rosin, the adhesive applied is of approximately the following proportions by weight and percentages:

| | | |
|---|---|---|
| China wood oil (tung oil) | 106 lbs. | 53% |
| Hardened rosin | 24 lbs. | 12% |
| Linseed oil | 20 lbs. | 10% |
| Dryer | 2 lbs. | 1% |
| Thinners, say | 48 lbs. | 24% |

One of the virtues of a waterproof binder of the present composition is that it not only penetrates the supporting base, rendering it waterproof, but also is of great utility as contrasted with organic glue (prepared from gelatinous matter) inasmuch as it may be used with oiled or waxed paper which has been water-proofed by treatment with so-called non-drying oil, such as castor oil, semi-drying oil, such as soya-bean oil, or even drying oil such as linseed oil, or China wood oil, or fish oil, waxy compounds, such as paraffin, beeswax, carnauba wax, etc., to which a glue bond will not adhere, but to which my improved binder readily adheres by virtue of its powers of permeation of the base and of commingling with such oiling, greasing or waxing agents. In practice, I not only find it convenient to heat the binder to facilitate its application to the back, but also to increase its powers of penetration of the base.

After the adhesive and abrasive materials are applied, the paper is suitably forced dried (or partially "baked" as it is said), to the desired extent by subjecting it in the usual manner to a temperature which I prefer to control between 130° F. and 150° F., depending upon the degree of hardness desired, an average of say 140° F., being in my opinion the optimum, a suitable degree of humidity being maintained in the drying chamber to prevent the paper from becoming too crisp or brittle.

The binder of my present invention is noteworthy in that it not only penetrates the paper, etc., of the backing or base, but penetrates, mixes with, or combines with various oils, greases and waxes that are commonly used as waterproofing agents for fabric, and this without weakening, breaking down, or other deleterious mechanical or chemical effects.

In cases where the surface of the fabric is not suitable for the application of a smooth coating of the binder I have found it convenient to apply a filler to the base to facilitate such application. This may consist of any one of the known fillers having a clayey siliceous, or like base.

Having thus described my invention and illustrated its use, what I claim as new and desire to secure by Letters Patent is:—

1. The new article of manufacture in the nature of sandpaper, comprising a flexible sheet of fabric, a grit or layer of abrasive particles, and a waterproof stable adhesive bond, including modified Chinawood oil interposed between said grit and said sheet and of a nature to adequately maintain its bonding effect in substantially full measure throughout the effective abrading life of the abrasive article even under sustained application of or immersion in water, but not deleteriously affecting the flexibility of said sheet when dry.

2. The new article of manufacture in the nature of sandpaper, comprising a flexible sheet of fabric, a grit or layer of abrasive particles, and a waterproof stable adhesive bond, including Chinawood oil and rosin interposed between said grit and said sheet and of a nature to adequately maintain its bonding effect in substantially full measure throughout the effective abrading life of the abrasive article even under sustained application of or immersion in water, but not deleteriously affecting the flexibility of said sheet when dry.

3. The new article of manufacture in the nature of sandpaper, comprising a flexible sheet of fabric, a grit or layer of abrasive particles, and waterproof stable adhesive bond, including Chinawood oil, treated rosin, and linseed oil interposed between said grit and said sheet and of a nature to adequately maintain its bonding effect in substantially full measure throughout the effective abrading life of the abrasive article even under sustained application of or immersion in water, but not deleteriously affecting the flexibility of said sheet when dry.

4. The new article of manufacture in the nature of sandpaper, comprising a flexible sheet of fabric, a grit or layer of abrasive particles, and waterproof stable adhesive bond, including Chinawood oil, treated rosin, linseed oil and a dryer interposed between said grit and said sheet and of a nature to adequately maintain its bonding effect in substantially full measure throughout the effective abrading life of the abrasive article even under sustained application of or immersion in water, but not deleteriously affecting the flexibility of said sheet when dry.

5. The new article of manufacture in the nature of sandpaper, comprising a flexible sheet of fabric, which is moisture-proof, a grit or layer of abrasive particles, and a waterproof stable adhesive bond, including a Chinawood oil, rosin and linseed oil interposed between said grit and said sheet and penetrating the latter and of a nature to adequately maintain its bonding effect in substantially full measure throughout the effective abrading life of the abrasive article even under sustained application of or immersion in water, but not deleteriously affecting the flexibility of said sheet when dry.

6. The new article of manufacture in the nature of sandpaper, comprising a flexible sheet of fabric, which is moisture-proof, a grit or layer of abrasive particles, and a waterproof stable adhesive bond, including Chinawood oil, rosin and linseed oil, interposed between said grit and said sheet and penetrating the latter to act as a solvent of and coalesce with the moisture proof material of the fabric and of a nature to adequately maintain its bonding effect in substantially full measure throughout the effective abrading life of the abrasive article even under sustained application of or immersion in water, but not deleteriously affecting the flexibility of said sheet when dry.

7. The new article of manufacture in the nature of sandpaper comprising a flexible sheet of fabric which contains a moisture-proofing oil, a grit or layer of abrasive particles and a waterproof stable adhesive bond, including Chinawood oil and a modifying agent therefor interposed between said grit and said sheet and penetrating the latter and uniting with said moisture-proofing oil and of a nature to adequately maintain its bonding effect in substantially full measure throughout the effective abrading life of the abrasive article even under sustained application of or immersion in water but not deleteriously affecting the flexibility of said sheet when dry.

8. The new article of manufacture in the nature of sandpaper comprising a flexible sheet of fabric, a grit or layer of abrasive particles, and a waterproof stable adhesive bond, including rosin and a drying oil for rendering same flexible when dry interposed between said grit and said sheet and of a nature to adequately maintain its bonding effect in substantially full measure throughout the effective abrading life of the abrasive article even under sustained application of or immersion in water, but not deleteriously affecting the flexibility of said sheet when dry.

9. The method of forming an abrasive article in the nature of sandpaper or the like which includes impregnating a suitable flexible sheet of fabric with a water-insoluble oil, and applying a grit or layer of abrasive particles to said sheet by interposing a coat of waterproof binder material, which is flexible when dry, containing an oil miscible with the oil of said sheet whereby to attach said grit to the sheet and form an article, which when dry is flexible, tenacious and impermeable by water.

10. The method of forming an abrasive article in the nature of sandpaper which includes as steps thereof, the application to a flexible sheet of fabric of a grit or layer of abrasive particles, by interposing a coat of waterproof material as a stable waterproof adhesive bond between said grit and one surface of said sheet, which is of a nature when dry to maintain the bonding effect throughout the effective abrading life of the abrasive article even under sustained application of or immersion in water, and hastening solidification of said adhesive by the application of heat without deleteriously affecting the flexibility of the article.

11. The method of forming an abrasive article in the nature of sandpaper which includes as steps thereof, the application to a flexible sheet of fabric, of a grit or layer of abrasive particles, by interposing a coat of waterproof material as a stable waterproof adhesive bond between said grit and one surface of said sheet and allowing said material to penetrate the sheet, and said adhesive being of a nature when dry to maintain the bonding effect throughout the effective abrading life of the abrasive article even under sustained application of or immersion in water, and solidifying said adhesive by the application of heat without deleteriously affecting the flexibility of the article.

12. The method of forming an abrasive article in the nature of sandpaper which includes as steps thereof, the application to a flexible sheet of fabric which includes therein a moisture-proofing agent, of a grit or layer of abrasive particles by interposing a coat of waterproof material as a stable waterproof adhesive bond between said grit and one surface of said sheet, and allowing said material to penetrate the sheet and unite with the moisture-proofing agent, said adhesive and agent being of a nature when dry to maintain the bonding effect throughout the effective abrading life of the abrasive article even under sustained application of or immersion of water, and solidifying said adhesive by the application of heat without deleteriously affecting the flexibility of the article.

13. The method of forming an abrasive article in the nature of sandpaper which includes as steps thereof the application to a flexible sheet of fabric which includes therein a water-insoluble wax or oil, of a grit or layer of abrasive particles by interposing a coat of waterproof material as a stable waterproof adhesive bond between said grit and one surface of said sheet, allowing said material to penetrate the sheet and unite with such water-insoluble wax or oil, said bond being of a nature when dry to maintain the bonding effect throughout the effective abrading life of the abrasive article even under sustained application of or immersion in water, and hastening solidification of said adhesive by the application of heat without deleteriously affecting the flexibility of the article.

14. The method of forming an abrasive article in the nature of sandpaper which includes as steps thereof, the application to a flexible sheet of fabric which includes therein a moisture-proofing agent, of a grit or layer of abrasive particles by interposing a coat of waterproof material containing an oil and a resin as a stable waterproof adhesive bond between said grit and one surface of said sheet and allowing said material to penetrate the sheet and unite with such moisture-proofing agent said oil and said agent being of a nature when dry to maintain the bonding effect throughout the effective abrading life of the abrasive article even under sustained application of or immersion in water, and hastening solidification of said adhesive by the application of heat without deleteriously affecting the flexibility of the article.

15. The method of forming an abrasive article in the nature of sandpaper which includes as steps thereof, the treatment of a flexible sheet of fabric with a water-proofing substance which enters the sheet, applying a grit or layer of abrasive particles to said sheet by interposing a coat of waterproof material as a stable waterproof adhesive bond between said grit and one surface of said sheet, allowing said adhesive to penetrate the sheet to unite with the waterproof substance thereof, said bond being of a nature to maintain the bonding effect throughout the effective abrading life of the article, and hastening solidification of said adhesive by the application of heat at a predetermined temperature.

16. The method of producing flexible abrasive material which comprises associating a suitable base with a coating of a varnish containing an abrasive and heating the same to a temperature about 140° F.

17. The method of producing flexible abrasive sheet material comprising association of a sheet cellulose base, and an oil, grease or wax waterproofing agent and a China wood oil varnish in the form of a coating containing an abrasive material and heating to a temperature about 140° F.

18. The method of forming an abrasive article in the nature of sandpaper which includes as steps thereof, the application to a flexible sheet of fabric containing a waterproofing agent, of a grit or layer of abrasive particles, by interposing a coat of waterproof material as a stable waterproof adhesive bond between said grit and one surface of said sheet, which is of a nature to unite with said waterproofing agent, and when dry to maintain the bonding effect throughout the effective life of the abrasive article even under sustained application of or immersion in water, and hastening solidification of said adhesive by the application of heat without deletoriously affecting the flexibility of the article.

19. A new abrasive article in the nature of sandpaper which includes a flexible sheet of fabric, a grit or layer of abrasive particles, a coating of heat solidified resinous waterproof material for uniting said grit to said sheet to form a stable waterproof adhesive bond between the grit and sheet and which is of a nature when dry to maintain the bonding effect throughout substantially the effective abrading life of the abrasive article even under sustained application of or immersion in water.

20. The method of making flexible abrasive sheet material which consists in combining with a sheet cellulose base, a waterproofing agent impregnated through the fibres thereof, and a separately applied grit-holding coating of adhesive, miscible with said agent but different therefrom.

21. The method of making flexible abrasive sheet material which consists in separately applying to a sheet cellulose base and in combining therewith an oil impregnated through the fibres thereof and a waterproof grit-holding coating of adhesive, miscible with said oil and co-operating therewith to bond the grit to the impregnated fibres.

22. The method of making flexible abrasive sheet material consisting in combining on a sheet cellulose base, a non-drying or semi-drying oil impregnated through the fibres thereof and a grit-holding coating containing drying oil, and baking said base to indurate said drying oil and thereby secure the grit to the base yet leave the finished abrasive sheet material flexible.

23. The method of making flexible abrasive sheet material consisting in combining with a sheet cellulose base, a non-drying or semi-drying oil impregnated through the fibres thereof and a grit-holding coating of an adhesive which is miscible with said oil, and indurating said adhesive by the application of heat thus more securely bonding the grit to the impregnated fibres yet leaving the finished abrasive sheet material pliable.

24. The method of making flexible abrasive sheet material consisting in impregnating a suitable base with a non-drying or semi-drying oily or greasy waterproofing agent, attaching the grit thereto by means of an adhesive containing a drying oil and gum and baking to produce a tough elastic yet relatively pliable coating securely bonded to the impregnated base.

25. The method of making flexible abrasive sheet material consisting in combining with a suitable waterproof base, a grit-holding coating of a baking varnish and baking the same thus producing a tough elastic and relatively pliable product.

26. The method of making sandpaper which consists in applying to a paper base a coating of baking varnish, applying grit thereto, baking the same and varying the degree of baking to control the softness of the product paper.

27. Flexible abrasive sheet material comprising a suitable fibrous base impregnated with a waterproofing agent and a grit-holding coating of an adhesive that is miscible with said agent but different therefrom and which co-operates therewith to bond the grit to the impregnated fibres.

28. Flexible abrasive sheet material comprising a suitable fibrous base impregnated with a non-drying or semi-drying oil, a surface coating of a baked oil-containing adhesive attaching the grit to the impregnated fibrous base.

29. Waterproof sand-paper comprising a paper base treated with an oil and a baked adhesive containing a drying oil and a gum. attaching the grit to the base.

30. The method of making flexible abrasive sheet material which consists in combining with a sheet cellulose base a grit-holding coating of adhesiive, and baking the same thereon.

31. Flexible abrasive sheet material comprising a sheet cellulose base combined with a grit-holding coating of adhesive baked thereon.

32. A new abrasive article in the nature of sandpaper which includes a flexible sheet of fabric, a grit or layer of abrasive particles, a coating of heat solidified water-proof material for uniting said grit to said sheet to form a stable water-proof adhesive bond between the grit and sheet and which is of a nature when dry to maintain the bonding effect throughout substantially the effective abrading life of the abrasive article even under sustained application of or immersion in water.

33. Waterproof sand-paper comprising a paper base treated with an oil and a baked adhesive containing a drying oil and a resin, attaching the grit to the base.

34. The method of making flexible abrasive sheet material consisting in combining with a suitable base, a grit-holding coating of a baking varnish and baking the same at a temperature above 140° F., thus producing a tough elastic and relatively pliable product.

35. The process of making a stable waterproof abrasive article in the nature of sandpaper or the like which includes applying to a flexible sheet of fabric a grit or layer of abrasive particles, and interposing a waterproof bond of a nature to maintain the bonding effect throughout the effective abrading life of the abrasive article when employed in a water abrading operation and not deleteriously affecting the flexibility of said sheet when dry, and uniting a waterproof auxiliary bonding coat of analogous character to the article by the application of heat.

In testimony whereof, I have hereunto signed my name.

FRANCIS G. OKIE.